United States Patent
Klemstine et al.

(10) Patent No.: US 11,619,255 B1
(45) Date of Patent: Apr. 4, 2023

(54) SYSTEM AND METHOD OF MAKING A CRANKSHAFT WITH ALTERNATE MATERIALS

(71) Applicant: GM Global Technology Operations LLC, Detroit, MI (US)

(72) Inventors: David C. Klemstine, Orion, MI (US); Guirong Cao, Troy, MI (US); Jianghuai Yang, Rochester Hills, MI (US); William A. Berry, Davison, MI (US); Qigui Wang, Rochester Hills, MI (US); Anil K. Sachdev, Rochester Hills, MI (US); Steven L. Burkholder, Archbold, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/698,410

(22) Filed: Mar. 18, 2022

(51) Int. Cl.
*F16C 3/04* (2006.01)
*B22D 19/04* (2006.01)
(Continued)

(52) U.S. Cl.
CPC ............... *F16C 3/10* (2013.01); *B22D 19/04* (2013.01); *F16C 3/20* (2013.01); *B23P 2700/07* (2013.01); *F16C 2202/06* (2013.01); *F16C 2202/08* (2013.01); *F16C 2204/66* (2013.01); *F16C 2220/02* (2013.01); *F16C 2223/30* (2013.01);
(Continued)

(58) Field of Classification Search
CPC .......... F16C 3/10; F16C 3/20; F16C 2202/06; F16C 2202/08; F16C 2204/66; F16C 2220/02; F16C 2223/30; F16C 2240/60; F16C 2360/22; B22D 19/04; B23P 2700/07; Y10T 29/49286
See application file for complete search history.

(56) References Cited

U.S. PATENT DOCUMENTS 465,699 A * 12/1891 Hardwick ............. F16F 15/283
74/603
1,534,411 A * 4/1925 Potter ........................ F16C 3/20
74/603

(Continued)

FOREIGN PATENT DOCUMENTS

CN 108916205 A * 11/2018 ............... B23P 15/14
FR 2892475 A1 * 4/2007 ............... F02B 75/06

*Primary Examiner* — Adam D Rogers
(74) *Attorney, Agent, or Firm* — Vivacqua Crane PLLC (57) ABSTRACT

A crankshaft for an internal combustion engine is provided. The crankshaft comprises at least four main journals aligned on a crankshaft axis of rotation defining a centerline. The crankshaft further comprises at least three pin journals. Each pin journal is disposed about a respective pin journal axis and positioned between the main journals. Each of the pin journals is joined to a pair of crank arms. Each pair of crank arms is joined to a respective main journal. Each of the main journals, pin journals, and crank arms is made of a first metallic material. Each crank arm has an over-molded counterweight metallurgically bonded thereto. Each counterweight is disposed opposite a respective pin journal relative to the centerline for balance and stability. Each counterweight is made of a second metallic material. The crankshaft has a weight ratio of the second metallic material to the first metallic material of between 0.20 to 0.50.

20 Claims, 4 Drawing Sheets

(51) Int. Cl.
*F16C 3/10* (2006.01)
*F16C 3/20* (2006.01)

(52) U.S. Cl.
CPC ..... *F16C 2240/60* (2013.01); *Y10T 29/49286* (2015.01)

(56) References Cited

U.S. PATENT DOCUMENTS

| | | | | |
|---|---|---|---|---|
| 4,730,512 | A * | 3/1988 | Ito | F16C 3/20 123/192.1 |
| 4,749,624 | A * | 6/1988 | Pete | B22D 19/0072 428/614 |
| 4,829,642 | A * | 5/1989 | Thomas | B22C 9/02 164/100 |
| 7,234,432 | B2 * | 6/2007 | Nagira | F16F 15/24 123/192.2 |
| 10,605,328 | B2 * | 3/2020 | Imano | F16F 15/26 |
| 2010/0043739 | A1 * | 2/2010 | Jang | F16C 3/20 123/192.2 |
| 2013/0146004 | A1 | 6/2013 | Hayman et al. | |
| 2016/0069382 | A1 * | 3/2016 | Chottiner | B23P 13/00 74/603 |
| 2016/0084295 | A1 * | 3/2016 | Murrish | F16F 15/283 74/603 |
| 2016/0146251 | A1 * | 5/2016 | Schreiber | F16C 33/103 384/288 |
| 2020/0048727 | A1 | 2/2020 | Yang et al. | |
| 2021/0115540 | A1 | 4/2021 | Yang et al. | |

* cited by examiner

SYSTEM AND METHOD OF MAKING A CRANKSHAFT WITH ALTERNATE MATERIALS

GOVERNMENT LICENSE RIGHTS

This invention was made with government support under contract No. DE-EE0008877 awarded by the U.S. Department of Energy. The government has certain rights in the invention.

INTRODUCTION

The present disclosure relates to crankshafts and, more particularly, systems and methods of manufacturing crankshafts having alternate materials for vehicles.

A crankshaft is a vehicle part able to perform a conversion between reciprocating motion and rotational motion. Crankshafts may be made in numerous manners such as by way of billet, forging, and casting. Currently, the manufacture of crankshafts may be improved to result in mass efficiency and cost saving.

SUMMARY

Thus, while current crankshafts achieve their intended purpose, there is a need for a new and improved system and method for manufacturing vehicular crankshafts. In accordance with embodiments and examples discussed herein, the present disclosure provides systems and methods of manufacturing a vehicular crankshaft having alternate materials, resulting in mass efficiency and mass savings. In turn, a manufacturing cost savings is realized.

In accordance with one aspect of the present disclosure, a crankshaft for an internal combustion engine is provided. The crankshaft comprises at least four main journals aligned on a crankshaft axis of rotation defining a centerline. The crankshaft further comprises at least three pin journals.

In this aspect, each pin journal is disposed about a respective pin journal axis and positioned between the main journals. Moreover, each of the respective pin journal axes is oriented parallel to and spaced radially from the crankshaft axis. Additionally, each of the pin journals is joined to a pair of crank arms for force transmission between the pin journal and the pair of crank arms. Further, each pair of crank arms is joined to a respective main journal for transmitting torque between the pair of crank arms and the main journal. In addition, each of the main journals, pin journals, and crank arms is made of a first metallic material.

Further to this aspect, each crank arm has an over-molded counterweight metallurgically bonded thereto. Moreover, each counterweight is disposed opposite a respective pin journal relative to the centerline for balance and stability. In addition, each counterweight is made of a second metallic material. The second metallic material is more dense than the first metallic material for mass efficiency. Furthermore, the crankshaft has a weight ratio of the second metallic material to the first metallic material of between 0.20 to 0.50.

In one embodiment, the first metallic material comprises a nodular iron alloy and a steel alloy, and wherein the second metallic material comprises a steel alloy and Tungsten. In another embodiment, the weight ratio of the second metallic material to the first metallic material is 0.36.

In another embodiment, the crank arm has a counterweight to crank arm weight ratio of between 2.0 and 3.0 for each counterweight disposed opposite a respective pin journal relative to the centerline. In still another embodiment, each over-molded counterweight comprises one of a full counterweight and a partial counterweight. The full counterweight has more mass than the partial counterweight. In yet another embodiment, the over-molded counterweight comprises a full counterweight to partial counterweight weight ratio of between 1.5 and 1.7.

In one embodiment, the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce).

In another embodiment, the nodular iron alloy has a nodularity greater than 85%. In this embodiment, the nodular iron alloy has a Young's modulus in the range of 175 to 195 GPa. Moreover, the nodular iron alloy has an as-cast ultimate tensile strength in the range of 750 to 950 MPa.

In yet another embodiment the crankshaft further comprises an outer coating comprised of one of a nickel (Ni) and copper (Cu) compound to promote metallurgical bonding between the first metallic material and the second metallic material. In one embodiment, the outer coating has a thickness of 1 microns to 10 microns.

In accordance with another aspect of the present disclosure, a system for manufacturing a crankshaft having alternate materials is provided. The system comprises a molding unit arranged to form a negative sand cast mold of the crankshaft. The mold comprises at least one molded cavity having a pattern with dimensions of the crankshaft.

In this aspect, the crankshaft is arranged or designed to comprise at least four main journals aligned on a crankshaft axis of rotation defining a centerline, and at least three pin journals. Each pin journal is disposed about a respective pin journal axis and positioned between the main journals. Moreover, each of the respective pin journal axes is oriented parallel to and spaced radially from the crankshaft axis. Additionally, each of the pin journals is joined to a pair of crank arms for force transmission between the pin journal and the pair of crank arms. Further, each pair of crank arms is joined to a respective main journal for transmitting torque between the pair of crank arms and the main journal. In addition, each of the main journals, pin journals, and crank arms is arranged to be of a first metallic material.

In this aspect, at least one of the crank arms is arranged to have an over-molded counterweight. The over-molded counterweight is arranged to be over-molded by the at least one of the crank arms and metallurgically bonded thereto. Moreover, each over-molded counterweight is arranged to be disposed opposite a respective pin journal relative to the centerline for balance and stability. Further, each over-molded counterweight is arranged to be of a second metallic material. The second metallic material is arranged more dense than the first metallic material for mass efficiency. Furthermore, the over-molded counterweight is disposed in the at least one molded cavity.

The system further comprises a furnace for melting the first metallic material at between 1400 degrees Celsius (° C.) and 1600° C. to define a molten metallic material. Moreover, the system further comprises a pouring mechanism for pouring the molten metallic material in the negative sand cast mold at between 1350° C. and 1450° C. such that the at least one over-molded counterweight is over-molded by the molten metallic material. Additionally, the system further comprises a cooling area for solidifying the molten metallic material in the negative sand cast mold such that the at least one of the crank arms is formed to over-mold the at least one over-molded counterweight. The at least one over-molded counterweight is arranged to be metallurgically bonded to the at least one of the crank arms defining the crankshaft at about 450° C.

In this aspect, the system further comprises a separation unit for separating the crankshaft from the negative sand cast mold. Moreover, the crankshaft has a weight ratio of the second metallic material to the first metallic material of between 0.20 to 0.50. In addition, the system comprises a controller in communication with the molding unit, the furnace, the pouring mechanism, and the separating unit. Moreover, the controller is configured to control the molding unit, the furnace, the pouring mechanism, and the separation unit. Furthermore, the system comprises a power source configured to power the molding unit, the furnace, the pouring mechanism, the separation unit, and the controller.

In one embodiment, the first metallic material comprises a nodular iron alloy and a steel alloy, and the second metallic material comprises a steel alloy and Tungsten. In another embodiment, the crank arm has a counterweight to crank arm weight ratio of 2.5 for each counterweight disposed opposite a respective pin journal relative to the centerline. In yet another embodiment, the over-molded counterweight comprises a full counterweight and a partial counterweight. The full counterweight has more mass than the partial counterweight, and the over-molded counterweight comprises a full counterweight to partial counterweight weight ratio of 1.6.

In another embodiment, the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce).

In still another embodiment, the nodular iron alloy has a nodularity greater than 85%, a Young's modulus in the range of 175 to 195 GPa, and an as-cast ultimate tensile strength in the range of 750 to 950 MPa.

In accordance with another aspect of the present disclosure, a method of manufacturing a crankshaft having alternate materials is provided. In this aspect, the method comprises providing a negative sand cast mold of the crankshaft. The crankshaft comprises at least four main journals aligned on a crankshaft axis of rotation defining a centerline. The crankshaft further comprises at least three pin journals.

In this aspect, each pin journal is disposed about a respective pin journal axis and positioned between the main journals. Moreover, each of the respective pin journal axes is oriented parallel to and spaced radially from the crankshaft axis. Additionally, each of the pin journals is joined to a pair of crank arms for force transmission between the pin journal and the pair of crank arms. Further, each pair of crank arms is joined to a respective main journal for transmitting torque between the pair of crank arms and the main journal. In addition, each of the main journals, pin journals, and crank arms is arranged to be of a first metallic material.

In this aspect, at least one of the crank arms is arranged to have an over-molded counterweight. Moreover, the over-molded counterweight is arranged to be over-molded by the at least one of the crank arms and metallurgically bonded thereto. Each over-molded counterweight is arranged to be disposed opposite a respective pin journal relative to the centerline for balance and stability. Further, each over-molded counterweight is arranged to be of a second metallic material. The second metallic material is arranged more dense than the first metallic material for mass efficiency.

In this aspect, the method further comprises disposing at least one over-molded counterweight in the negative mold of the crankshaft and melting the first metallic material to define a molten metallic material. The method further comprises pouring the molten metallic material in the negative sand cast mold such that the at least one over-molded counterweight is over-molded by the molten metallic material.

In this aspect, the method further comprises solidifying the molten metallic material in the negative sand cast mold such that the at least one of the crank arms is formed to over-mold the at least one over-molded counterweight. The at least one over-molded counterweight is metallurgically bonded to the at least one of the crank arms defining the crankshaft. The method further comprises separating the crankshaft from the negative sand cast mold. The crankshaft having a weight ratio of the second metallic material to the first metallic material of between 0.20 to 0.50.

In one example, the first metallic material comprises a nodular iron alloy and a steel alloy, and wherein the second metallic material comprises a steel alloy and Tungsten. In another example, the weight ratio of the second metallic material to the first metallic material is 0.36.

In still another example, the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce)

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2A:
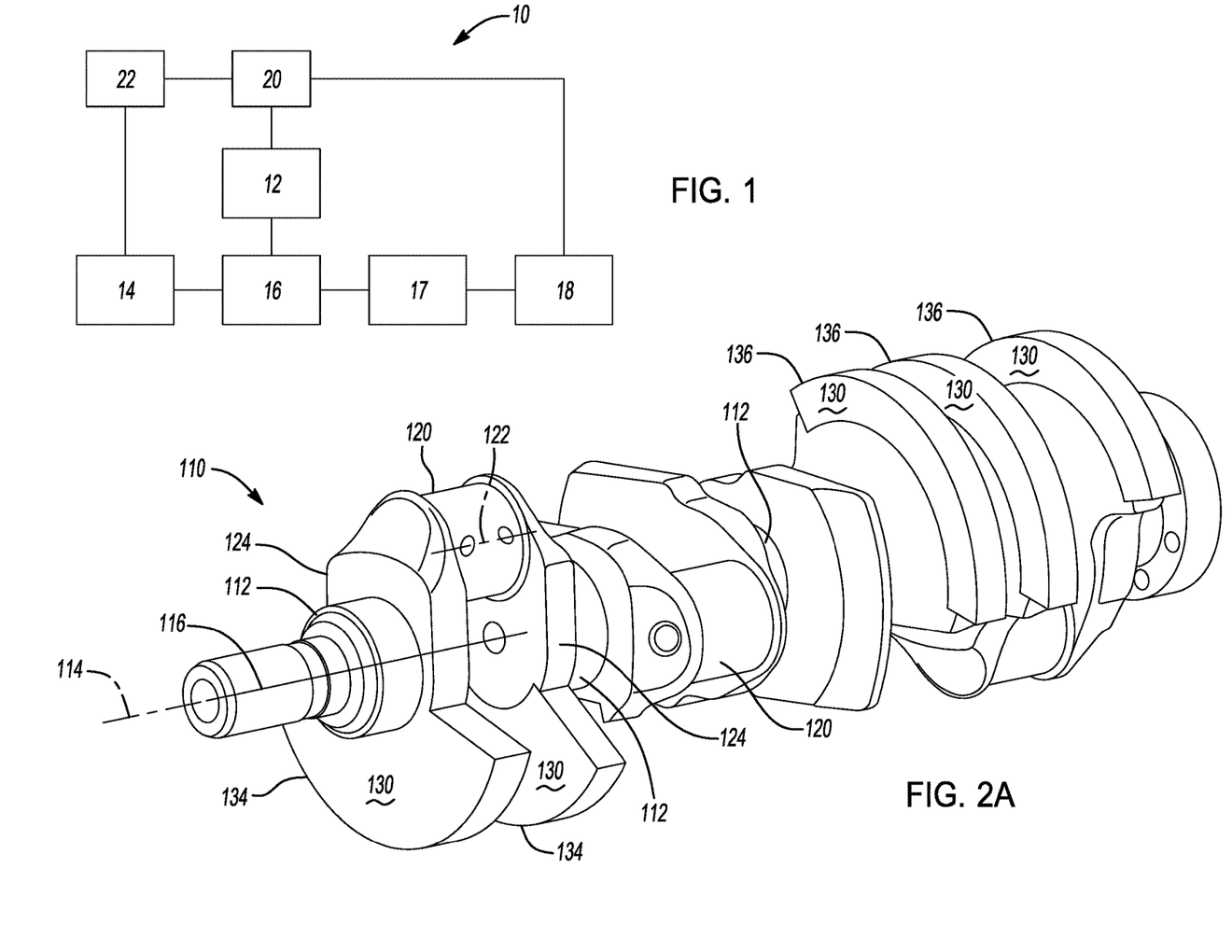
FIG. 1 is a schematic view of a system for manufacturing a crankshaft having alternate materials in accordance with one embodiment of the present disclosure.
FIG. 2A is a perspective view of a crankshaft made by the system of FIG. 1 in accordance with one embodiment.

FIG. 1 depicts a system 10 for manufacturing a crankshaft having alternate materials in accordance with one embodiment of the present disclosure. As shown, the system 10 comprises a molding unit 12 arranged to have a negative sand cast mold of the crankshaft. The mold comprises at least one molded cavity, preferably a plurality of molded cavities, to define the crankshaft to be cast. The molding unit 12 is arranged to make the mold having a pattern (not shown) with dimensions of the crankshaft. In one example, the mold has patterns made with green or chemically bonded sand. An assembly of core may then be disposed within the mold to further define the dimensions or structure of the pattern. It is to be understood that the mold may be made by any other suitable manner without departing from the spirit or scope of the present disclosure.

Figure 2B:
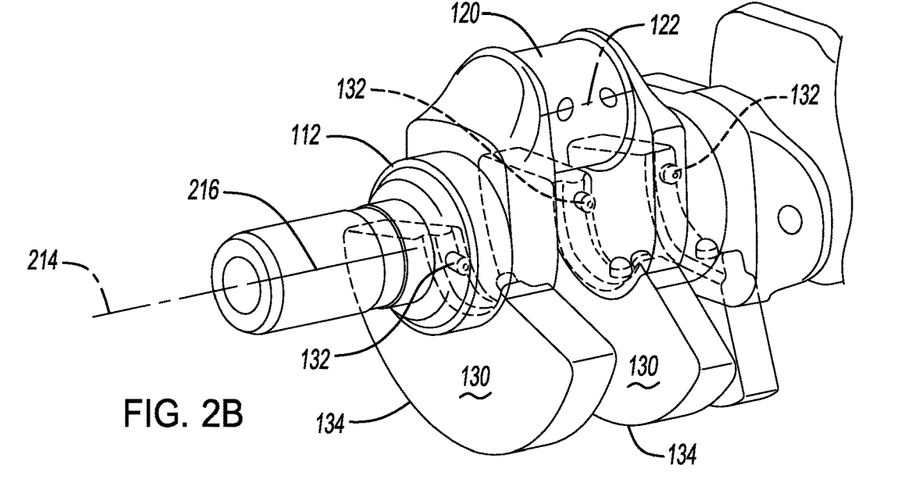
FIG. 2B is an enlarged view of the crankshaft of FIG. 2A.

Referring to FIGS. 2A and 2B as an example, a crankshaft 110 is designed or arranged to comprise at least four main journals 112 (here, five main journals) aligned on a crankshaft axis 114 of rotation defining a centerline 116, and at least three pin journals 120 (here, four pin journals). In this embodiment, each pin journal 120 is solid and disposed about a respective pin journal axis 122 and positioned between the main journals 112. Moreover, each pin journal axis 122 is oriented parallel to and spaced radially from the crankshaft axis 114. Additionally, each of the pin journals 120 is joined to a pair of crank arms 124 for force transmission between the pin journal 120 and the pair of crank arms 124. Further, each pair of crank arms 124 is joined to a respective main journal 112 for transmitting torque between the pair of crank arms 124 and the main journal 112. In addition, each of the main journals 112, pin journals 120, and crank arms 124 is made of a first metallic material.

As depicted in FIGS. 2A and 2B as an example, at least one of the crank arms 124 is arranged to have an over-molded counterweight 130. During manufacturing of the crankshaft 110, the over-molded counterweight 130 is over-molded by the at least one of the crank arms 124 and metallurgically bonded thereto. As shown in FIG. 2B, each counterweight 130 comprises a concave portion from which a locking mechanism 132 or a plurality of locking mechanisms (such as a peg) extends. As each counterweight 130 is over-molded by the at least one of the crank arms and metallurgically bonded thereto, the locking mechanism provide further attachment to the crank arm.

Moreover, each over-molded counterweight 130 is disposed opposite a respective pin journal 120 relative to the centerline 116 for balance and stability. Further, each over-molded counterweight 130 is made of a second metallic material. The second metallic material is more dense than the first metallic material for mass efficiency. As will be discussed in greater detail below, the over-molded counterweight 130 is disposed in the at least one molded cavity of the negative sand cast mold during implementation of the system 10 when manufacturing the crankshaft 110 having alternate materials.

In one embodiment, the first metallic material comprises a nodular iron alloy and a steel alloy, and the second metallic material comprises a steel alloy and Tungsten. In this embodiment, the crank arm 124 has a counterweight to crank arm weight ratio of 2.5 for each counterweight disposed opposite a respective pin journal relative to the centerline. Preferably, the nodular iron alloy has a nodularity greater than 85%, a Young's modulus in the range of 175 to 195 GPa, and an as-cast ultimate tensile strength in the range of 750 to 950 MPa.

In one embodiment, the over-molded counterweight 130 may comprise one of a full counterweights 134 and a partial counterweight 136. In this embodiment, the full counterweight 134 has more mass than the partial counterweight 136, and the over-molded counterweight comprises a full counterweight to partial counterweight weight ratio of 1.6.

Figure 2C:
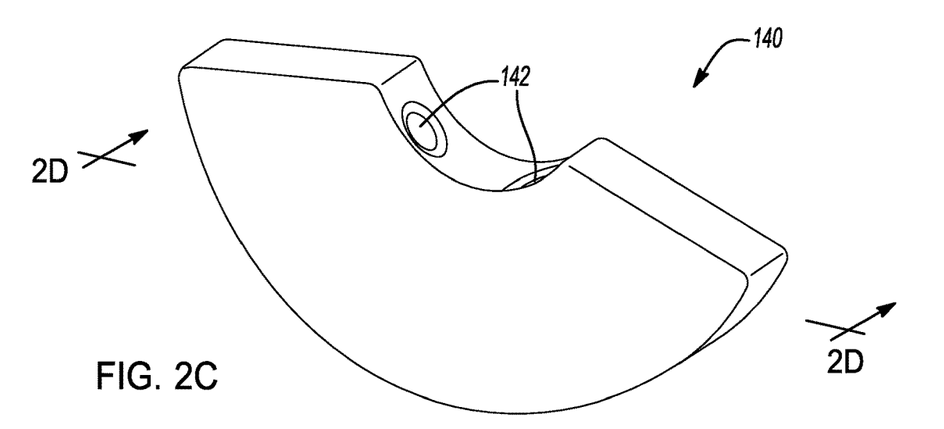
FIG. 2C is a perspective view of an over-molded counterweight in accordance with another embodiment of the present disclosure.
Figure 2D:
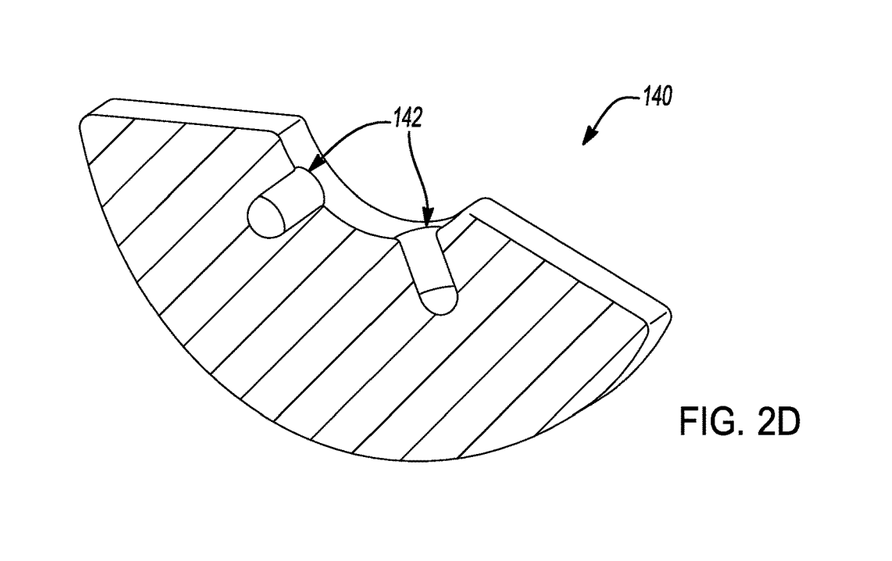
FIG. 2D is a cross-sectional view of the over-molded counterweight of FIG. 2C taken along lines 2D-2D.

FIGS. 2C and 2D illustrate an over-molded counterweight 140 to be over-molded by the first metallic material during casting or molding of the crankshaft in accordance with another embodiment of the present disclosure. During manufacturing of the crankshaft, the over-molded counterweight 140 is over-molded by the at least one of the crank arms and metallurgically bonded thereto. As shown in FIGS. 2C and 2D, each counterweight 140 comprises a concave portion on which open cavities 142 are formed. The open cavities may serve as locking mechanisms as each counterweight 140 is over-molded by the at least one of the crank arms and metallurgically bonded thereto. As a result, the locking mechanism provide further attachment to the crank arm.

Referring back to FIG. 1, the system 10 further comprises a furnace 14 for melting the first metallic material (e.g., nodular iron alloy) at between 1400 degrees Celsius (° C.) and 1600° C. to define a molten metallic material. In one embodiment, the furnace 14 may be charged with nodular iron alloy. The furnace 14 may be an electric arc furnace, an induction furnace, or any other suitable furnace without departing from the spirit or scope of the present disclosure.

Moreover, the system 10 further comprises a pouring mechanism 16 for pouring the molten metallic material in the negative sand cast mold at between 1350° C. and 1450° C. such that the at least one over-molded counterweight is over-molded by the molten metallic material, defining the dimensions of the crankshaft 110 to be cast. In one example, the pouring mechanism 16 may be a pouring ladle. In this example, the pouring ladle receives the molten metallic material (e.g., nodular iron alloy) for pouring the molten metallic material in the negative sand cast mold. The mold may then be gated or sealed with chemically bonded sand.

Thereafter, the molten metallic material is allowed to cool to about 450° C. in a designated cooling area (discussed below) to solidify the molten metallic material (in the plurality of molded cavities of the mold) to form a target component having dimensions of the crankshaft. Preferably, the crankshaft is made of nodular iron alloy comprising a composition of 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce) and a balance of iron (Fe).

Additionally, the system 10 further comprises a cooling area 17 for solidifying the molten metallic material in the negative sand cast mold such that the at least one of the crank arms is formed to over-mold the at least one over-molded counterweight. The at least one over-molded counterweight is arranged to be metallurgically bonded to the at least one of the crank arms.

In this aspect, the system 10 further comprises a separation unit 18 for separating the target component of the crankshaft from the negative sand cast mold having a plurality of molded cavities defining the crankshaft. In one embodiment, the crankshaft has a weight ratio of the second metallic material to the first metallic material of between 0.20 to 0.50, and preferably 0.36. It is to be understood that the weight ratio of the second metallic material to the first metallic material may be before a step of machining if so desired. In another embodiment, the weight ratio of the second metallic material to the first metallic material may be after machining without departing from the scope or spirit of the present disclosure.

In one embodiment, the separation unit 18 is arranged to shakeout or remove the mold comprising the chemically bonded sand from the target component. To accomplish removal of the mold from the target component, an automated unit may be used to break the mold and obtain the target component therefrom. For example, a vibration unit or table may be used having a bottom catch screen for receiving mold particles from the mold. It is to be understood that breaking the mold by any other suitable manner may be used without departing from the spirit or scope of the present disclosure.

In this embodiment, the separation unit 18 is further arranged to degate the target component after removing the mold from the target component. As known in the art, degating the target component may involve removing parts of bonded sand used to fill the mold during casting and gating.

In one embodiment, the separation unit 18 is further arranged to clean the target component after degating. In one example, a shot blast machine may be used to apply or shoot beads (e.g. metallic beads) on surfaces of the target component. To meet alloy design expectations, the separation unit 18 may also include an inspection area wherein the target component is inspected for its mechanical dimensions, mechanical properties, chemical composition, and microstructure. In one example, a computerized system such as a coordinate measuring machine (CMM) may be used to measure mechanical dimensions of the target component, defining the crankshaft 110. Any suitable methods and apparatus may be used to evaluate dimensions, mechanical properties, chemical composition, and microstructure of the crankshaft without departing from the spirit or scope of the present disclosure.

As shown, the system 10 further comprises at least one controller 20 in communication with the molding unit 12, the furnace 14, the pouring mechanism 16, and the separation unit 18. The controller 20 is configured to control the molding unit 12, the furnace 14, the pouring mechanism 16, and the separation unit 18. Furthermore, the system 10 comprises a power source 22 configured to power the molding unit 12, the furnace 14, the pouring mechanism 16, the separation unit 18, and the controller 20.

Figure 3A:
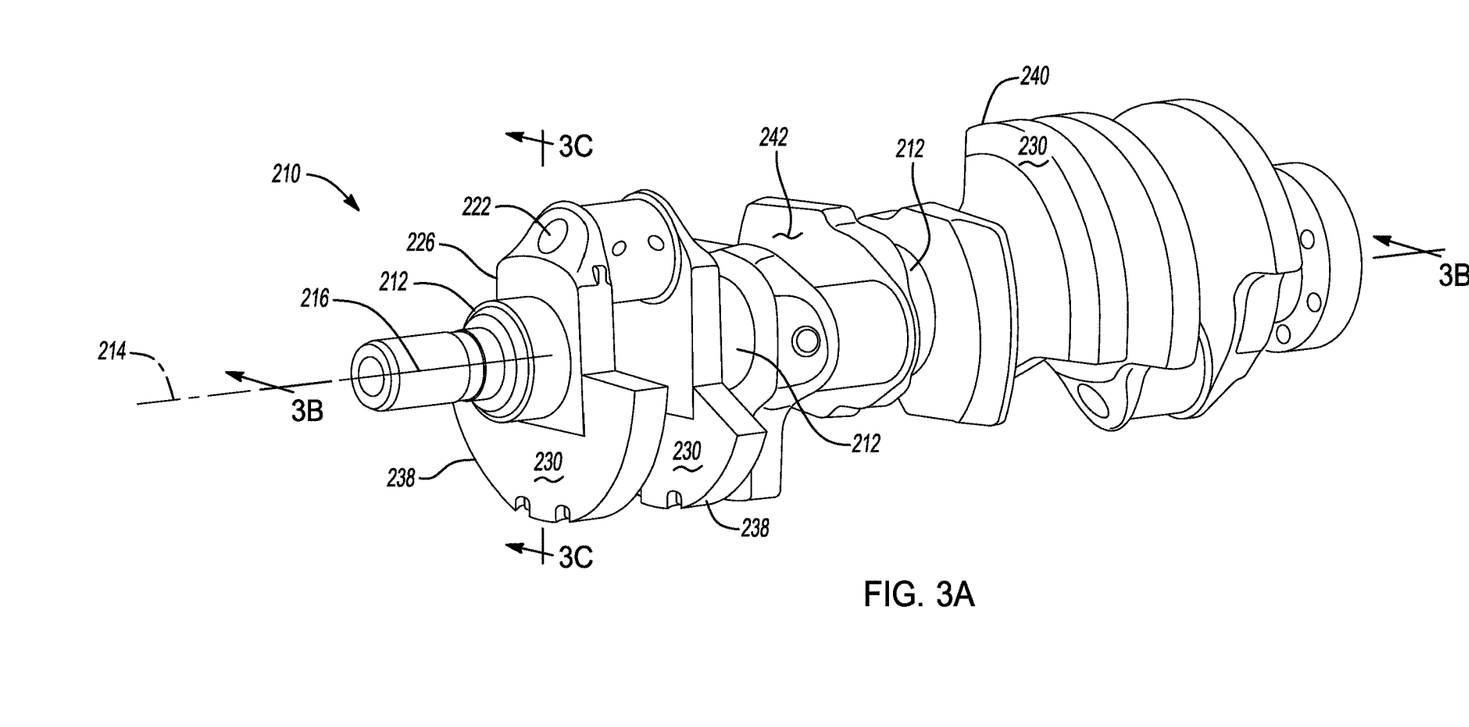
FIG. 3A is a perspective view of a crankshaft made by the system of FIG. 1 in accordance with another embodiment.
Figures 3B, 3C:
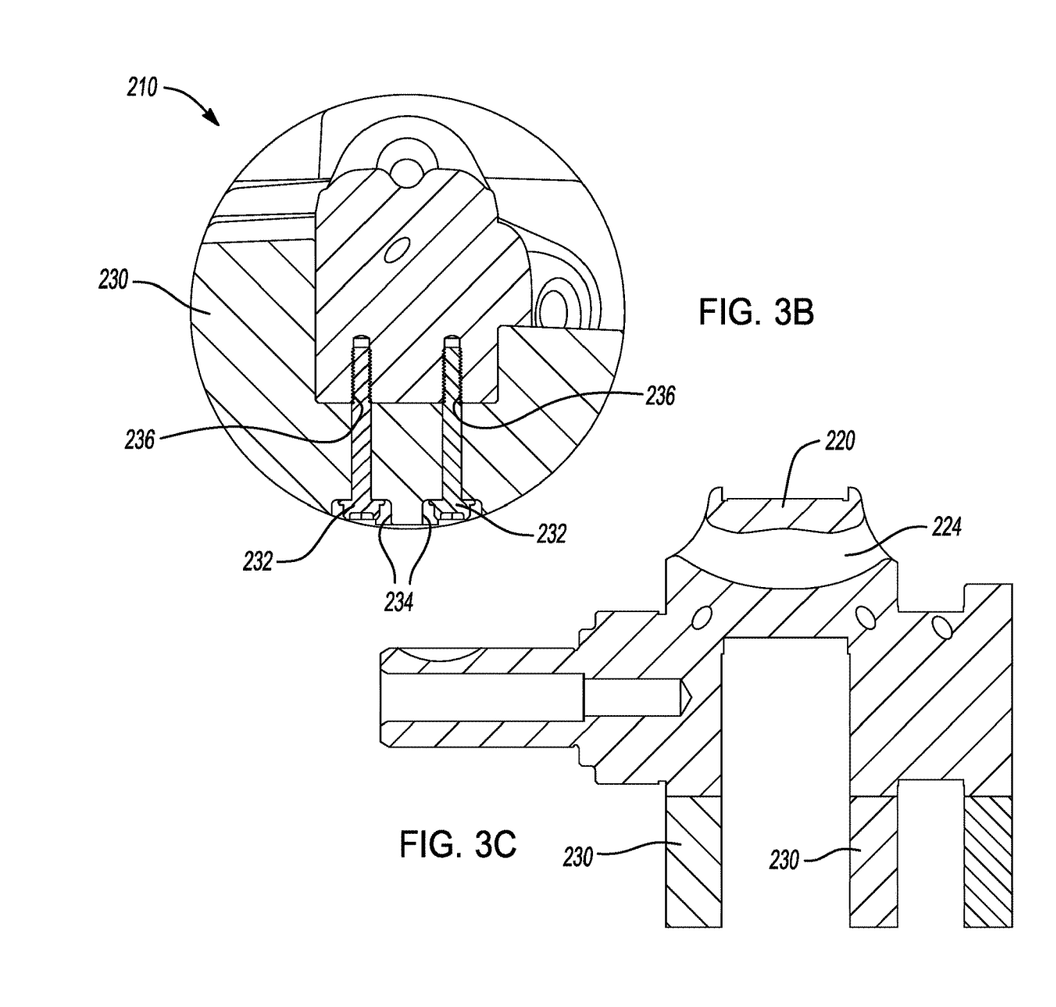
FIG. 3B is a cross-sectional view of the crankshaft of FIG. 3A taken along lines 3B-3B.
FIG. 3C is a cross-sectional view of the crankshaft of FIG. 3A taken along lines 3C-3C.

In accordance with another embodiment of the present disclosure, FIGS. 3A-3C illustrate a crankshaft 210 for an internal combustion engine. As in the previous embodiment, the crankshaft 210 of this embodiment comprises at least four main journals 212 (here, five main journals) aligned on a crankshaft axis 214 of rotation defining a centerline 216. The crankshaft 210 further comprises at least three pin journals 220 (here, four pin journals). Moreover, each pin journal 220 is disposed about a respective pin journal axis 222 and positioned between the main journals 212. Further, each of the respective pin journal axes 222 is oriented parallel to and spaced radially from the crankshaft axis 214.

In this embodiment, each pin journal 220 is hollowed, and has a pin hole 224 formed therethrough which is adjacent its respective pin journal axis 222. The pin hole 224 serves to lower the mass of the pin journal thereby lowering the mass of the over-molded counterweight (discussed below). In turn, the crankshaft 210 has an overall weight that is relatively less thereby resulting in mass efficiency thereof.

Additionally, each of the pin journals 220 is joined to a pair of crank arms 226 for force transmission between the pin journal 220 and the pair of crank arms 226. Further, each pair of crank arms 226 is joined to a respective main journal 212 for transmitting torque between the pair of crank arms 226 and the main journal 212. In addition, each of the main journals 212, pin journals 220, and crank arms 226 is made of a first metallic material.

Further to this aspect, each crank arm 226 has an over-molded counterweight 230 metallurgically bonded thereto. Moreover, each counterweight 230 is disposed opposite a respective pin journal 220 relative to the centerline 216 for balance and stability. As shown in FIG. 3B-3C, each over-molded counterweight 230 is further attached to its respective crank arm 226 by way of a securing mechanism 232 such as bolts. In this embodiment, each bolt has threads and is disposed through a bolt hole 234 formed through the counterweight 230. The threads are arranged to be threaded through a respective crank arm having a threaded female bore 236 formed therethrough. As a result, the securing mechanism 232 provide enhanced securement of the counterweight to the crank arm.

As in the previous example discussed above, each counterweight is made of a second metallic material. The second metallic material is more dense than the first metallic material for mass efficiency. Furthermore, the crankshaft has a weight ratio of the second metallic material to the first metallic material of between 0.20 to 0.50 and preferably 0.36. In one embodiment, the first metallic material comprises a nodular iron alloy and a steel alloy, and wherein the second metallic material comprises a steel alloy and Tungsten. In this embodiment, the crank arm has a counterweight to crank arm weight ratio of between 2.0 and 3.0 for each counterweight disposed opposite a respective pin journal relative to the centerline.

Each over-molded counterweight 230 may comprise one of a full counterweight 238 and a partial counterweight 240. In this embodiment, the full counterweight 238 has more mass than the partial counterweight 240. For example, the over-molded counterweight comprises a full counterweight to partial counterweight weight ratio of between 1.5 and 1.7.

Moreover, the over-molded counterweight may be comprised of nodular iron alloy having a composition of 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce), and a balance of iron (Fe). Preferably, the nodular iron alloy has a nodularity greater than 85%, a Young's modulus in the range of 175 to 195 GPa, and an as-cast ultimate tensile strength in the range of 750 to 950 MPa.

As shown in FIG. 3A, the crankshaft 210 may further comprise an outer coating 242 comprised of one of a nickel (Ni) compound and copper (Cu) compound (or alloys thereof) to promote metallurgical bonding between the first metallic material and the second metallic material. In one embodiment, the outer coating 242 has a thickness of 1 microns to 10 microns, and more preferably a thickness of 3 microns to 5 microns. The outer coating 242 may be disposed entirely or partially about the crankshaft 210 without departing from the spirit or scope of the present disclosure.

Figure 4:
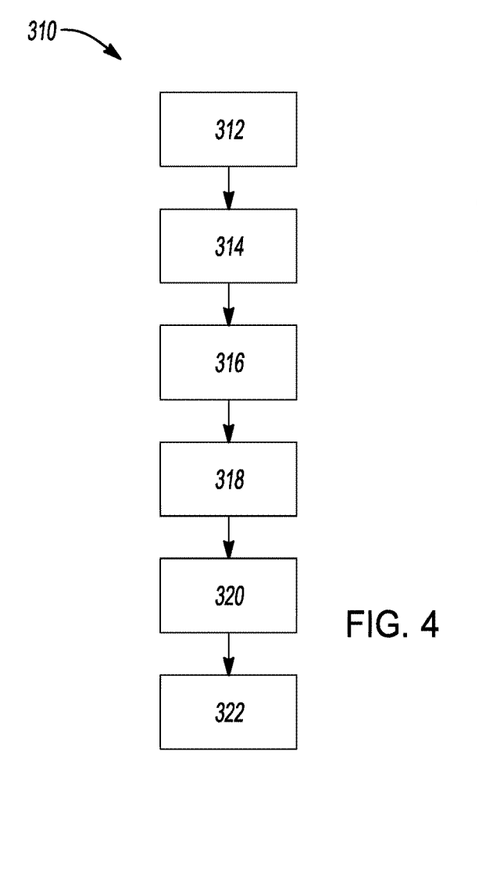
FIG. 4 is a flowchart of a method of manufacturing a crankshaft by the system in FIG. 1 in accordance with one example of the present disclosure.

FIG. 4 depicts a method 310 of manufacturing a crankshaft having alternate materials in accordance with one example of the present disclosure. In this example, the method 310 may be implemented by the system of FIG. 1. As shown, the method 310 comprises in box 312 providing a negative sand cast mold of the crankshaft. As discussed above and shown in FIGS. 2A-2B, the crankshaft comprises at least four main journals aligned on a crankshaft axis of rotation defining a centerline. The crankshaft further comprises at least three pin journals.

As discussed above, each pin journal is disposed about a respective pin journal axis and positioned between the main journals. Moreover, each of the respective pin journal axes is oriented parallel to and spaced radially from the crankshaft axis. Additionally, each of the pin journals is joined to a pair of crank arms for force transmission between the pin journal and the pair of crank arms. Further, each pair of crank arms is joined to a respective main journal for transmitting torque between the pair of crank arms and the main journal. In addition, each of the main journals, pin journals, and crank arms is arranged to be of a first metallic material.

As in FIGS. 2A-2B, at least one of the crank arms is arranged to have an over-molded counterweight. Moreover, the over-molded counterweight is arranged to be over-molded by the at least one of the crank arms and metallurgically bonded thereto. Each over-molded counterweight is arranged to be disposed opposite a respective pin journal relative to the centerline for balance and stability. Further, each over-molded counterweight is arranged to be of a second metallic material. The second metallic material is arranged more dense than the first metallic material for mass efficiency.

In this example, the method 310 further comprises in box 314 disposing at least one over-molded counterweight in the negative mold of the crankshaft. The over-molded counterweight may be formed by way of machining, cast, billet, forging, or any other suitable manner without departing from the spirit or scope of the present disclosure.

Further in this example, the method 310 further comprises in box 316 melting the first metallic material to define a molten metallic material. In one example, the first metallic material may be melted by the furnace discussed above. The furnace may be an electric arc furnace, an induction furnace, or any other suitable furnace without departing from the spirit or scope of the present disclosure.

The method 310 further comprises in box 318 pouring the molten metallic material in the negative sand cast mold such that the at least one over-molded counterweight is over-molded by the molten metallic material. In one example, step of pouring may implement the pouring mechanism and the pouring ladle of the system in FIG. 1. In this example, the pouring ladle receives the molten metallic material and then pours the molten metallic material in the mold. The mold may then be gated or sealed with chemically bonded sand.

In this aspect, the method 310 further comprises in box 320 solidifying the molten metallic material in the negative sand cast mold such that the at least one of the crank arms is formed to over-mold the at least one over-molded counterweight. The at least one over-molded counterweight is metallurgically bonded to the at least one of the crank arms defining the crankshaft.

The step of solidifying may involve allowing the molten metallic material to cool to about 450° C. Cooling may be performed in a designated cooling area or within the mold to solidify the molten metallic material (in the plurality of molded cavities of the mold) to form a target crankshaft casting.

The method 310 further comprises in box 322 separating the crankshaft from the negative sand cast mold. The crankshaft having a weight ratio of the second metallic material to the first metallic material of between 0.20 to 0.50. In one example, the step of separating comprises shaking out or removing the mold comprising the chemically bonded sand from the cast crankshaft. As in the system 10 of FIG. 1, to accomplish removal of the mold from the cast crankshaft, an automated unit is used to break the mold and obtain the cast crankshaft therefrom. For example, a vibration unit or table may be used having a bottom catch screen for receiving mold particles from the mold. It is to be understood that breaking the mold may be achieved by any suitable manner such as a vibrating unit without departing from the spirit or scope of the present disclosure.

In this example, the step of separating may comprise degating the target crankshaft casting after removing the mold from the crankshaft and cleaning the target crankshaft casting after degating. As in the system 10 of FIG. 1, a shot blast machine may be used to apply or shoot metallic beads on surfaces of the target crankshaft casting. To meet design expectations, the separation unit may also include an inspection area wherein the target crankshaft casting is inspected for its dimensions, mechanical properties, chemical composition, and microstructure. For example, a computerized system such as a CMM may be used to measure mechanical dimensions of the target crankshaft, defining the crankshaft of the present disclosure. Any suitable methods and apparatus may be implemented to evaluate mechanical dimensions, mechanical properties, chemical composition, and microstructure of the crankshaft without departing from the spirit or scope of the present disclosure.

In one example, the first metallic material comprises a nodular iron alloy and a steel alloy, and wherein the second metallic material comprises a steel alloy and Tungsten. Preferably, the weight ratio of the second metallic material to the first metallic material is 0.36.

In another example, the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A crankshaft for an internal combustion engine, the crankshaft comprising:
    at least four main journals aligned on a crankshaft axis of rotation defining a centerline; and
    at least three pin journals, each pin journal being disposed about a respective pin journal axis and positioned between the main journals, each of the respective pin journal axes being oriented parallel to and spaced radially from the crankshaft axis, each of the pin journals being joined to a pair of crank arms for force transmission between the pin journal and the pair of crank arms, each pair of crank arms being joined to a respective main journal for transmitting torque between the pair of crank arms and the respective main journal, each of the main journals, pin journals, and crank arms being made of a first metallic material, each crank arm having an over-molded counterweight metallurgically bonded thereto, each counterweight disposed opposite a respective pin journal relative to the centerline for balance and stability, each counterweight being made of a second metallic material, the second metallic material being more dense than the first metallic material for mass efficiency, the crankshaft having a weight ratio of the second metallic material to the first metallic material of between 0.20 to 0.50.

2. The crankshaft of claim 1 wherein the first metallic material comprises a nodular iron alloy and a steel alloy, and wherein the second metallic material comprises a steel alloy and tungsten.

3. The crankshaft of claim 2 wherein the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce).

4. The crankshaft of claim 2 wherein the nodular iron alloy has a nodularity greater than 85%, a Young's modulus in the range of 175 to 195 GPa, and an as-cast ultimate tensile strength in the range of 750 to 950 MPa.

5. The crankshaft of claim 2 the crankshaft further comprising an outer coating comprised of one of a nickel (Ni) and copper (Cu) compound to promote metallurgical bonding between the first metallic material and the second metallic material.

6. The crankshaft of claim 5 wherein the outer coating has a thickness of 1 microns to 10 microns.

7. The crankshaft of claim 1 wherein the weight ratio of the second metallic material to the first metallic material is 0.36.

8. The crankshaft of claim 1 wherein each crank arm has a counterweight to crank arm weight ratio of between 2.0 and 3.0 for each counterweight disposed opposite a respective pin journal relative to the centerline.

9. The crankshaft of claim 1 wherein each over-molded counterweight comprises one of a full counterweight and a partial counterweight, the full counterweight having more mass than the partial counterweight.

10. The crankshaft of claim 9 wherein each over-molded counterweight comprises a full counterweight to partial counterweight weight ratio of between 1.5 and 1.7.

11. A system for manufacturing a crankshaft having alternate materials, the system comprising:
a molding unit arranged to form a negative sand cast mold of the crankshaft, the mold comprising at least one molded cavity having a pattern with dimensions of the crankshaft, the crankshaft comprising:
at least four main journals aligned on a crankshaft axis of rotation defining a centerline; and
at least three pin journals, each pin journal being disposed about a respective pin journal axis and positioned between the main journals, each of the respective pin journal axes being oriented parallel to and spaced radially from the crankshaft axis, each of the pin journals being joined to a pair of crank arms for force transmission between the pin journal and the pair of crank arms, each pair of crank arms being joined to a respective main journal for transmitting torque between the pair of crank arms and the respective main journal, each of the main journals, pin journals, and crank arms being arranged to be of a first metallic material,
at least one of the crank arms arranged to have an over-molded counterweight, the over-molded counterweight being arranged to be over-molded by the at least one of the crank arms and metallurgically bonded thereto, each over-molded counterweight arranged to be disposed opposite a respective pin journal relative to the centerline for balance and stability, each over-molded counterweight arranged to be of a second metallic material, the second metallic material being arranged more dense than the first metallic material for mass efficiency,
wherein the at least one over-molded counterweight is disposed in the at least one molded cavity;
a furnace for melting the first metallic material at between 1400 degrees Celsius (° C.) and 1600° C. to define a molten metallic material;
a pouring mechanism for pouring the molten metallic material in the negative sand cast mold at between 1350° C. and 1450° C. such that the at least one over-molded counterweight is over-molded by the molten metallic material;
a cooling area for solidifying the molten metallic material in the negative sand cast mold such that the at least one of the crank arms is formed to over-mold the at least one over-molded counterweight, the at least one over-molded counterweight being metallurgically bonded to the at least one of the crank arms defining the crankshaft;
a separation unit for separating the crankshaft from the negative sand cast mold, the crankshaft having a weight ratio of the second metallic material to the first metallic material of between 0.20 to 0.50;
a controller in communication with the molding unit, the furnace, the pouring mechanism, and the separation unit, the controller configured to control the molding unit, the furnace, the pouring mechanism, and the separation unit; and
a power source configured to power the molding unit, the furnace, the pouring mechanism, the separation unit, and the controller.

12. The system of claim 11 wherein the first metallic material comprises a nodular iron alloy and a steel alloy, and wherein the second metallic material comprises a steel alloy and tungsten.

13. The system of claim 12 wherein the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce).

14. The system of claim 12 wherein the nodular iron alloy has a nodularity greater than 85%, a Young's modulus in the range of 175 to 195 GPa, and an as-cast ultimate tensile strength in the range of 750 to 950 MPa.

15. The system of claim 11 wherein each crank arm has a counterweight to crank arm weight ratio of 2.5 for each counterweight disposed opposite a respective pin journal relative to the centerline.

16. The system of claim 11 wherein each over-molded counterweight comprises one of a full counterweight and a partial counterweight, the full counterweight having more mass than the partial counterweight, and wherein each over-molded counterweight comprises a full counterweight to partial counterweight weight ratio of 1.6.

17. A method of manufacturing a crankshaft having alternate materials, the method comprising:
  providing a negative sand cast mold of the crankshaft, the crankshaft comprising:
    at least four main journals aligned on a crankshaft axis of rotation defining a centerline; and
    at least three pin journals, each pin journal being disposed about a respective pin journal axis and positioned between the main journals, each of the respective pin journal axes being oriented parallel to and spaced radially from the crankshaft axis, each of the pin journals being joined to a pair of crank arms for force transmission between the pin journal and the pair of crank arms, each pair of crank arms being joined to a respective main journal for transmitting torque between the pair of crank arms and the respective main journal, each of the main journals, pin journals, and crank arms being arranged to be of a first metallic material;
    at least one of the crank arms arranged to have an over-molded counterweight, the over-molded counterweight being arranged to be over-molded by the at least one of the crank arms and metallurgically bonded thereto, each over-molded counterweight arranged to be disposed opposite a respective pin journal relative to the centerline for balance and stability, each over-molded counterweight arranged to be of a second metallic material, the second metallic material being arranged more dense than the first metallic material for mass efficiency;
  disposing the at least one over-molded counterweight in the negative mold of the crankshaft;
  melting the first metallic material at between 1400 degrees Celsius (° C.) and 1600° C. to define a molten metallic material;
  pouring the molten metallic material in the negative sand cast mold at between 1350° C. and 1450° C. such that the at least one over-molded counterweight is over-molded by the molten metallic material;
  solidifying the molten metallic material in the negative sand cast mold such that the at least one of the crank arms is formed to over-mold the at least one over-molded counterweight, the at least one over-molded counterweight being metallurgically bonded to the at least one of the crank arms defining the crankshaft; and
  separating the crankshaft from the negative sand cast mold, the crankshaft having a weight ratio of the second metallic material to the first metallic material of between 0.20 to 0.50.

18. The crankshaft of claim 17 wherein the first metallic material comprises a nodular iron alloy and a steel alloy, and wherein the second metallic material comprises a steel alloy and tungsten.

19. The method of claim 18 wherein the nodular iron alloy comprises 2.2 to 3.2 weight percent (wt %) carbon (C), 1.7 to 2.3 wt % silicon (Si), 0.2 to 0.6 wt % manganese (Mn), 0 to 0.03 wt % phosphorous (P), 0 to 0.02 wt % sulfur (S), 0.2 to 0.6 wt % copper (Cu), 0.1 to 0.4 wt % chromium (Cr), 0.4 to 0.8 wt % nickel (Ni), 0.15 to 0.45 wt % molybdenum (Mo), 0.2 to 1.0 wt % cobalt (Co), 0.02 to 0.06 wt % magnesium (Mg), 0 to 0.002 wt % cerium (Ce).

20. The crankshaft of claim 17 wherein the weight ratio of the second metallic material to the first metallic material is 0.36.

* * * * *